US012617154B2

(12) United States Patent
Lorusso et al.

(10) Patent No.: US 12,617,154 B2
(45) Date of Patent: May 5, 2026

(54) DEPOSITION PROCESS OPTIMIZATION SYSTEM MULTI EXTRUDER AND RELATED METHOD

(71) Applicant: ROBOZE S.p.A., Bari (IT)

(72) Inventors: Alessio Lorusso, Bari (IT); Simone Cuscito, Bari (IT); Antonio Saponara, Bari (IT); Flavio Ciccarone, Bari (IT); Marino Andriani, Bari (IT); Matteo Rege', Bari (IT)

(73) Assignee: ROBOZE SPA, Bari (IT)

( * ) Notice: Subject to any disclaimer, the term of this patent is extended or adjusted under 35 U.S.C. 154(b) by 142 days.

(21) Appl. No.: 18/479,586

(22) Filed: Oct. 2, 2023

(65) Prior Publication Data

US 2024/0109255 A1     Apr. 4, 2024

(30) Foreign Application Priority Data

Sep. 30, 2022    (IT) ........................ 102022000020223

(51) Int. Cl.
B29C 64/386          (2017.01)
B29C 48/02          (2019.01)
(Continued)

(52) U.S. Cl.
CPC ............ B29C 64/386 (2017.08); B29C 48/02 (2019.02); B29C 48/025 (2019.02);
(Continued)

(58) Field of Classification Search
CPC .............................. B29C 64/25; B29C 64/295
See application file for complete search history.

(56) References Cited

U.S. PATENT DOCUMENTS 9,969,122 B1 *   5/2018   Smiddy .................. B29C 35/16
10,059,053 B2   8/2018   Jaker et al.
(Continued)

FOREIGN PATENT DOCUMENTS

JP       2015112871 A  *  6/2015   ........... B29C 64/118
KR       101863874 B1 *  6/2018   ............. A61L 27/14
(Continued)

OTHER PUBLICATIONS

Italy Search Report for IT102022000020223 completed Mar. 21, 2023, 13 pages.

*Primary Examiner* — Timothy Kennedy
(74) *Attorney, Agent, or Firm* — NIXON & VANDERHYE

(57)          ABSTRACT

A system for optimizing the multi-extruder deposition process in a 3D printer including multiple extruders requires each extruder to have a body including an outer thermal insulation shell; the shell allowing the inlet/outlet of a fluid for the active and controlled refrigeration of the extruder. A method for optimizing the multi-extruder deposition process in a 3D printer with multiple extruders involves managing the temperature of each extruder using active refrigeration sized so as to have a sudden control of the cooling ramp and to manage the viscosity of the material in the event of extruder change. For the entire duration of the printing with another extruder, the unused extruder nozzle remains in a limited range around the extrusion temperature, thus eliminating downtime, while the solidified filament from the sudden forced cooling is pulled back into a low temperature nozzle area where it does not degrade during non-use.

29 Claims, 14 Drawing Sheets

(51) Int. Cl.

| | |
|---|---|
| *B29C 48/025* | (2019.01) |
| *B29C 48/25* | (2019.01) |
| *B29C 48/86* | (2019.01) |
| *B29C 48/87* | (2019.01) |
| *B29C 48/92* | (2019.01) |
| *B29C 64/118* | (2017.01) |
| *B29C 64/209* | (2017.01) |
| *B29C 64/25* | (2017.01) |
| *B29C 64/295* | (2017.01) |
| *B29C 64/364* | (2017.01) |
| *B33Y 30/00* | (2015.01) |
| *B33Y 50/02* | (2015.01) |

(52) U.S. Cl.

CPC .......... *B29C 48/256* (2019.02); *B29C 48/865* (2019.02); *B29C 48/87* (2019.02); *B29C 48/92* (2019.02); *B29C 64/118* (2017.08); *B29C 64/209* (2017.08); *B29C 64/25* (2017.08); *B29C 64/295* (2017.08); *B29C 64/364* (2017.08); *B33Y 30/00* (2014.12); *B33Y 50/02* (2014.12); *B29C 2948/92209* (2019.02); *B29C 2948/92704* (2019.02)

(56) References Cited

U.S. PATENT DOCUMENTS

| | | | | |
|---|---|---|---|---|
| 2004/0231593 | A1* | 11/2004 | Edwards ............. | B41J 2/04581 |
| | | | | 118/719 |
| 2014/0263534 | A1* | 9/2014 | Post ...................... | B29C 64/106 |
| | | | | 226/196.1 |
| 2016/0236409 | A1* | 8/2016 | Armani ................. | B29C 64/106 |
| 2016/0297110 | A1* | 10/2016 | Wu ......................... | B29C 35/16 |
| 2018/0111336 | A1* | 4/2018 | Mantell ..................... | B05C 5/02 |
| 2018/0178448 | A1 | 6/2018 | Kakuta | |
| 2018/0290365 | A1* | 10/2018 | Noorazar ............... | B29C 48/92 |
| 2019/0168452 | A1* | 6/2019 | Besim .................. | B29C 64/118 |
| 2019/0184633 | A1 | 6/2019 | Sydow et al. | |
| 2020/0298492 | A1* | 9/2020 | Yirmibesoglu ......... | B29B 7/826 |
| 2020/0338822 | A1* | 10/2020 | Davenport ............. | B33Y 10/00 |

FOREIGN PATENT DOCUMENTS

| | | | | |
|---|---|---|---|---|
| KR | 20190115537 A | * | 10/2019 | .......... B29C 64/209 |
| WO | WO-2020255069 A1 | * | 12/2020 | ............. B33Y 30/00 |

* cited by examiner

DETAIL B

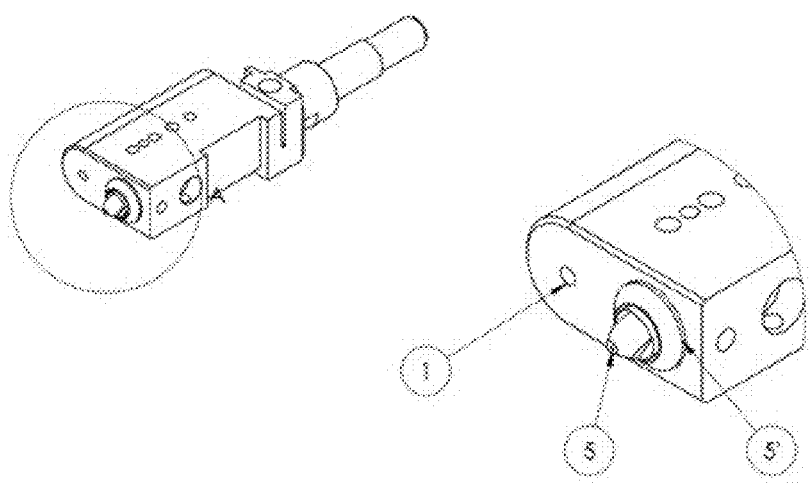
DETAIL A
SCALE 2:1
FIG. 5
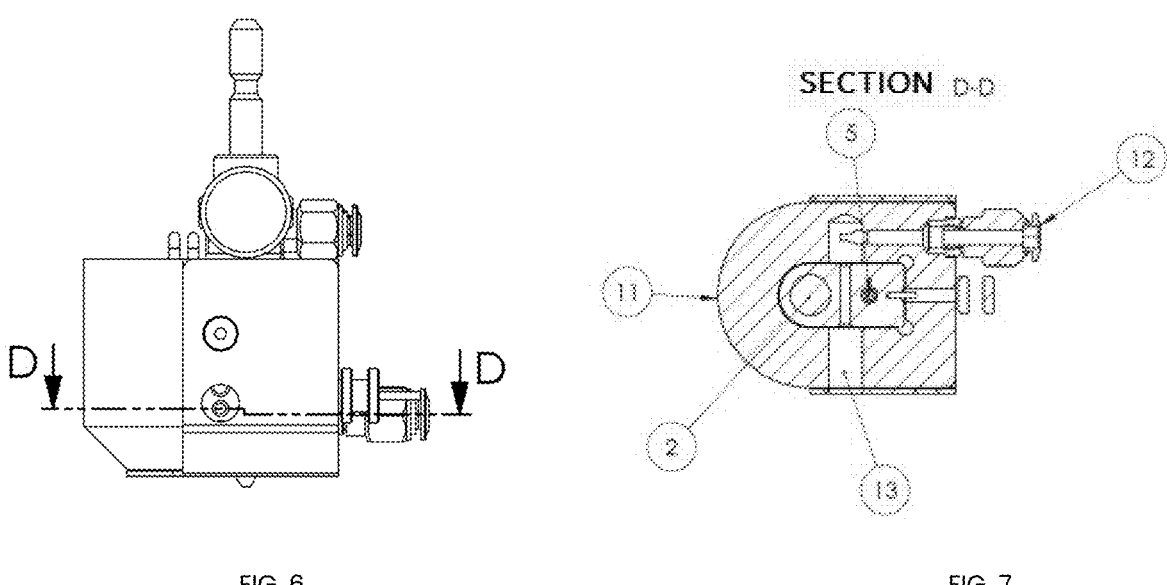
SECTION D-D
FIG. 6
FIG. 7

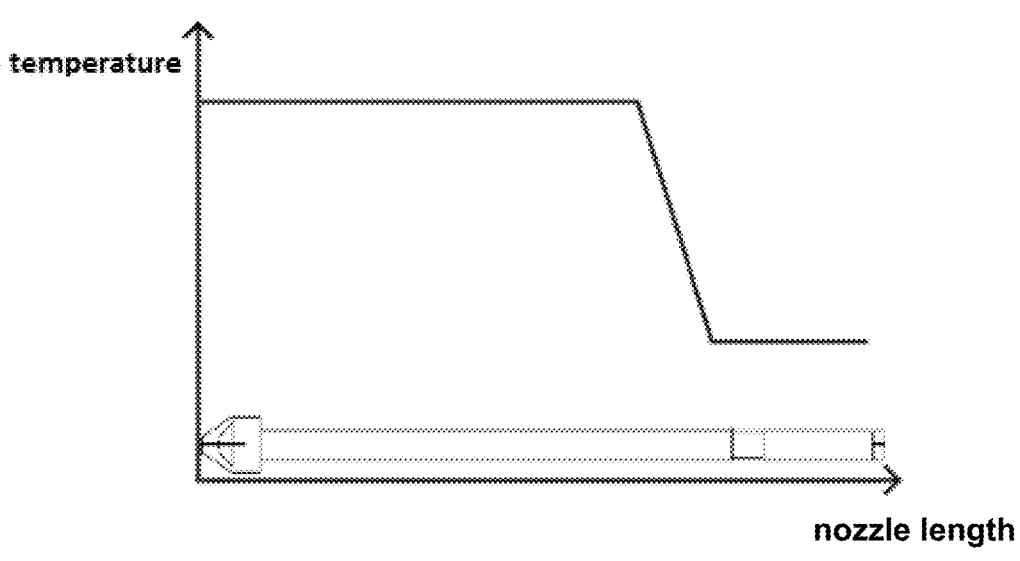
FIG. 12
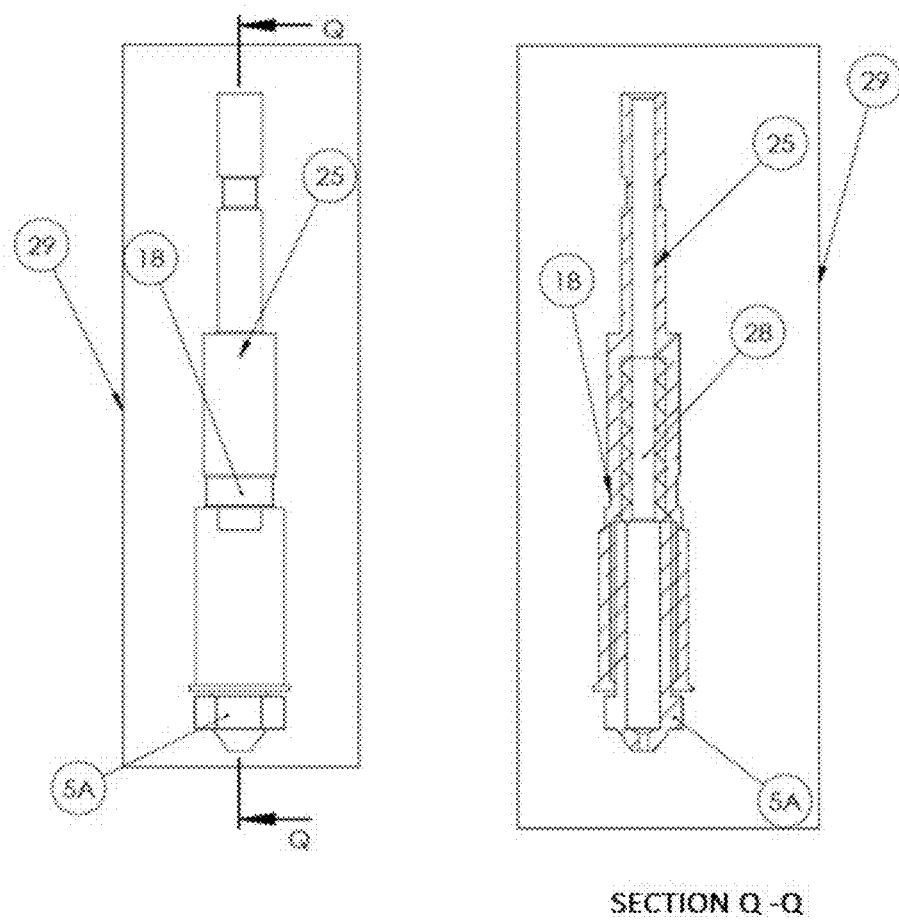
SECTION Q -Q
SCALE 2:1
FIG. 13                 FIG. 14

SECTION O-O
SCALE 3:2

DETAIL P
SCALE 3:1

SECTION K-K

DETAIL L
SCALE 2 : 1

SECTION J-J

DETAIL M
SCALE 3 : 2

DEPOSITION PROCESS OPTIMIZATION SYSTEM MULTI EXTRUDER AND RELATED METHOD

CROSS-REFERENCE TO RELATED APPLICATIONS

This application claims the priority under 35 USC 119(a) of IT patent application 102022000020223 filed on Sep. 30, 2022, the entirety of which is incorporated herein by reference.

BACKGROUND OF THE INVENTION

Field of the Invention

The present invention relates to the sector of 3D printing of three-dimensional objects, with a particular reference to the issues relating to the need to switch from one extruder to another of the same 3D printer, to use two or more different materials during the printing.

More specifically, the invention relates to an innovative extruder, which below will also be called HVP-PRO (High Viscosity Polymers-Professional), which is an extruder designed for FFF technology 3D printers optimized for the extrusion of high performance polymers and for printing processes which involve the use of multiple filaments, and therefore respective extruders that must be used alternating from one to the other one, during the 3D printing of the same piece.

Description of the Related Art

Generally, the air or liquid refrigeration used in 3D printers performs a thermal break function, or the protection of the electrical components. It is also used to avoid thermal deformations and/or softening of the filament in areas other than the melting tank of the extruder, or alternatively, in the case of low-melting polymers, to refrigerate, and therefore solidify, the melted material once deposited.

It is a peculiar feature of the present invention that—conversely to what is known—refrigeration is used for an active control of the temperature inside the melting tank, so as to modify the viscosity of the polymer based on the stage of the printing process, and reduce the times needed for the extruder heating and cooling steps.

As it will be better described below, the extruder which is the subject of the present invention has been designed to achieve at least the following objects:

Controlling the thermal profile and viscosity of the polymer by means of an active refrigeration system Increasing the printing speeds Reducing preheating times by virtue of an improved energy efficiency Reducing the number of components with respect to existing technologies In addition thereto, the present invention provides a better printing performance which also derives from the increase in the extrusion speed which may not be achieved with parameter optimization alone. In this regard, it should be noticed that as the temperature increases beyond a certain threshold, there is a corresponding polymer degradation with direct consequences on the performance of the finished component; a further significant increase in temperature may cause the rapid carbonization of the molten fluid inside the duct, thus preventing the extrusion itself. Increasing the speed would correspond to a reduction in the mechanical properties of the part created, due to a lower temperature of the molten fluid exiting the nozzle, as well as an increase in printing failures due to the increase in pressure inside the melting tank which would require an increase in thrust on the filament to achieve the extrusion.

From the above considerations, it may be understood that, even increasing the "Extrusion temperature" and the "Extrusion speed", using currently known equipment, it is not possible to obtain the desired performance.

The HVP-PRO extruder according to the present invention is substantially a suitably machined metal block, made up of one or more parts welded to one another, and integral with the printing head of the 3D printer. The HVP-PRO therefore overcomes the issue of needing to replace the extruder in the event of clogging or in the event of using filaments with different melting points. This leads to a significant reduction in machine preparation times and to a lesser wear of the electrical parts of the extruder which are sensitive to the manual skills of the user.

The reduced waste material and the shortened preparation times lead to greater printer productivity and a lower environmental impact.

The extruder described, thus, is to be considered an integral part of the printer and no longer a consumable item.

Another peculiar application of the invention relates to the case in which the printing process involves multiple extruders, where it is essential to optimize the times used during the activation and deactivation sequence thereof.

Commonly, this function is managed by passivating (i.e., cooling) the extruder during the entire period in which it is not directly involved in the printing process, to avoid the degradation of the polymer inside the melting tank thereof and losses of material on the printed part which would cause unwanted inclusions in the product which would make it unusable.

It should be noticed that, in the case of super-polymers, this strategy is not effective due to the high process temperatures involved. The thermal inertia of the extruder, both during the heating and cooling steps, significantly increases the time required to change the extruder. The extruder change sequence, therefore, introduces a number of downtime steps, proportional to the number of layers deposited with different materials (and therefore with different extruders).

BRIEF DESCRIPTION OF THE DRAWINGS

The invention will be described in connection with the included drawings, in which:

FIG. 5 is another detailed view illustrating that the lower edge of the housing of the nozzle may be cylindrical or conical;

FIG. 6 illustrates that the first hole for housing the heating resistor may be a through hole or a blind hole;

FIG. 7 is a sectional view of FIG. 6;

FIG. 12 is a plot of temperature along the nozzle length;

FIG. 13 illustrates a second embodiment of the extruder;

FIG. 14 is a cross-sectional view of the extruder of FIG. 13;

DETAILED DESCRIPTION

Figures 1, 2:
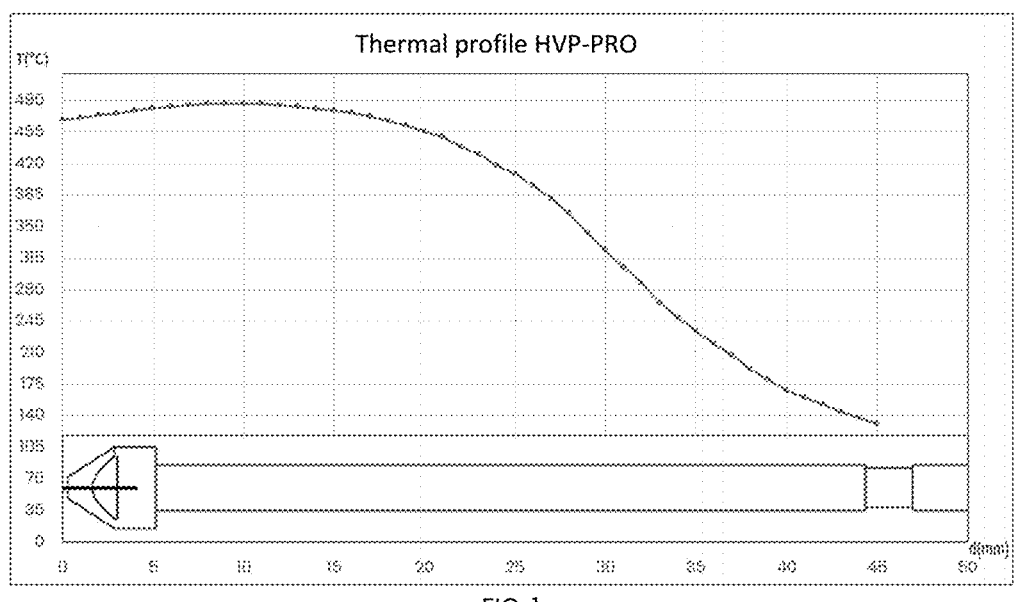
FIG. 1 is a plot of temperature as a function of distance from nozzle tip.
FIG. 2 is an illustration of how the nozzle is virtually divided into two different regions.

For the reasons explained so far, the extruder described has been designed so as to have an inflection point which may be seen in the graph temperature vs distance from nozzle tip, in which there is a sudden decrease in temperature (FIG. 1).

In fact, the extruder remains within a limited range around the extrusion temperature for the entire duration of the printing with another extruder, thus eliminating downtime, while the filament solidified by the sudden forced cooling is pulled back into a low-temperature area of the nozzle where it does not degrade during the period of non-use.

The cooling step is managed by a dedicated control system, forcing an air flow comprised between 10 l/min and 100 l/min through the extruder block. The refrigeration system has been sized so as to have a sudden control of the cooling ramp and to manage the viscosity of the material in the event of an extruder change.

The active control of the cooling step, and therefore of the viscosity of the polymer, allows to eliminate the contamination of the molded piece due to material losses, and to ensure an effective cleaning of the melting tank during the retraction of the filament and the regeneration of the tank itself. According to the invention, the term "tank regeneration" means the self-cleaning process of the melting tank which usually occurs during a clean out. The increase in viscosity of the material helps to streamline the removal of any carbon residues, formed during the downtime period of the extruder, from the inner walls of the nozzle.

In accordance with the invention, the nozzle is virtually divided into two different regions (FIG. 2):

the pre-chamber, defined by "wire tear distance"

the chamber, defined by "unload distance", which is the portion of the inner volume of the nozzle corresponding to the melting tank, in which the material is in the molten state when the nozzle is in use;

The volume of the individual regions is optimized for each filament, changing the length of such regions.

The two regions are managed in different steps of the extruder change: during the extruder change procedure, the filament may be retracted into two different positions corresponding to the maximum heights of the two regions. These filament retraction distances are established directly by the printer following the logic defined below.

The entire extruder change process involves 4 steps:

Part Removal: the printing head of the 3D printer moves from the printing object to the cleaning tray Purge ExA: passivation of the active extruder and extruder switch Purge EXI: regenerating the melting tank of the new activated extruder Part Approaching: retrieval of the printing coordinate by the printing head, referring to the extruder just activated.

All the movements of the printing head of the 3D printer, performed by the printing plane towards the cleaning tray, start after having carried out a sudden reduction of the polymer temperature by means of the active refrigeration means and then a retraction of the active extruder filament equal to the length of the pre-chamber (wire tear distance).

For all the extruders that pass and/or remain in a state of non-activity, the filament is retracted up to the deactivation position equal to the chamber (wire unload distance).

Each time an extruder passes from the inactive state to the active state, it has to regenerate the melting tank by carrying out an extrusion whose function is to eliminate the part of filament inside the nozzle which is exposed to temperatures close to the melting point and to clean the inner walls of the nozzle, so as to always ensure the same quality of the extruded polymer.

Below, the procedure carried out according to the present invention, in the case of a printing head provided with at least two extruders T0 and T1, during an extruder change sequence, passing from the extruder T0 to the extruder T1, is described in detail:

Start of Sequence

T0 ACTIVE

"PART REMOVAL":

1) Activating active refrigeration (T=Printing temperature−delta temperature)

2) Storing printing coordinate

3) Retracting filament to an extent equal to the length of the pre-chamber

4) Lowering printing plane

5) Moving printing head into park position at cleaning tray

"PURGE EXA":

6) Checking temperature (T=Printing temperature−delta temperature)

7) Retracting filament to an extent equal to the length of the entire chamber

8) Performing a cleaning sequence of the tip of the extruder nozzle T0 onto a brush and onto a spatula in the cleaning tray.

"ACTIVATION OF PASSIVATED EXTRUDER":

Activation/passivation occurs by means of a pneumatic piston managed by a PLC-controlled solenoid valve which moves the selected extruder transversely with respect to the printing plate, so as to alternatively lower or raise the extruders based on the one selected. Since the extruders T0 and T1 are integral with the printing head, a translational movement on the plane XY of the head is superimposed on the transversal movement, so as to position the newly selected extruder in the same coordinate as the passivated one.

T1 ACTIVE

"PURGE EXI":

9) Activating extruder heating T1 (T=printing T)
10) Extruding an amount of filament equal to the length of the chamber plus an additional amount to regenerate the chamber.
11) Retracting an amount equal to the length of the pre-chamber

"PART APPROACHING":

12) Checking the extruder temperature T1 (T=printing T)
13) Performing the cleaning sequence of the tip of the extruder nozzle T1 onto the brush and onto the spatula in the cleaning tray
14) Restoring the position (X, Y) of the 3D printer printing head on the printing plane
15) Raising the printing plane to restore the position Z thereof
16) Performing an extrusion of the filament equal to the volume of the pre-chamber Sequence ended.

Figure 3:
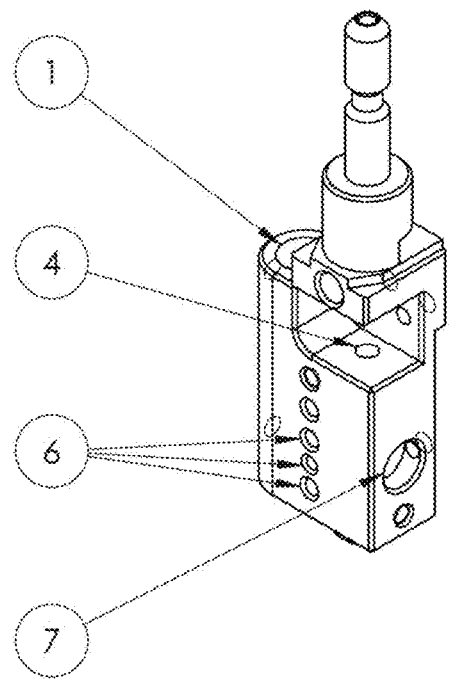
FIG. 3 is an isometric view of the extruder body.

In the preferred embodiment of the invention described, the geometry of the extruder body (FIG. 3) provides, in particular:

a first hole (1) for housing the heating resistor (2) of the polymer melting tank,
a second hole (4) for housing the extruder nozzle (5),
one or more refrigeration holes (6) of the melting tank,
a third hole (7) for housing the temperature probe (8).

Figure 4:
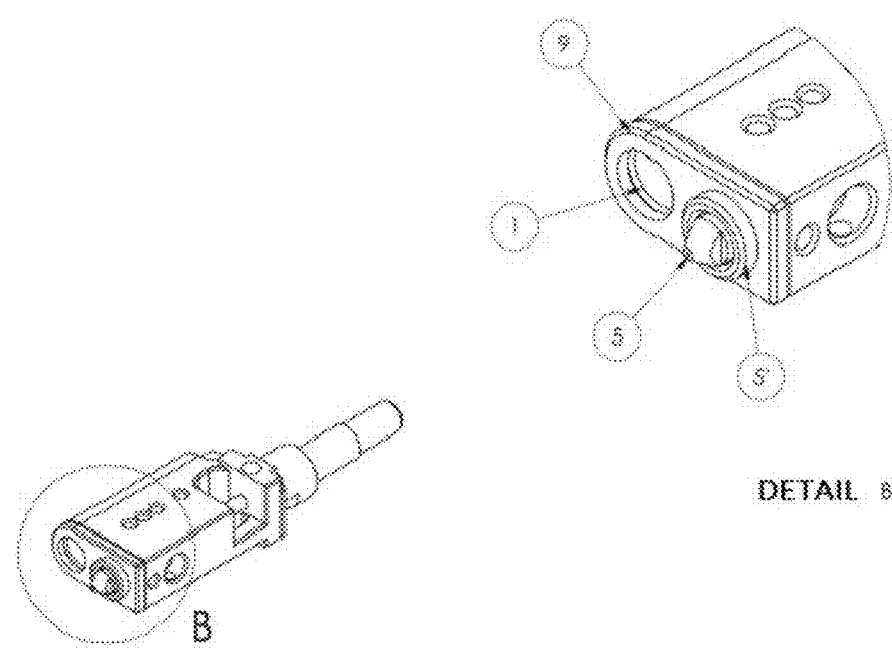
FIG. 4 is a detailed view of the lower end of the housing of the nozzle.

One of the peculiarities of the invention relates to the fact that the lower end of the housing of the nozzle (5) has an edge (5') with a geometry designed to favor the conduction of heat towards the area of contact with the lower tip of the nozzle itself (FIG. 4).

With reference to FIG. 5, such lower edge (5') of the housing of the nozzle may be cylindrical or conical.

Furthermore, the aforesaid first hole (1) for housing the heating resistor (2) may be a through hole or a blind hole (FIG. 6).

The system for fastening the nozzle (5) in the extruder body may be of the fixed type or with fast coupling/release means.

Figure 8:
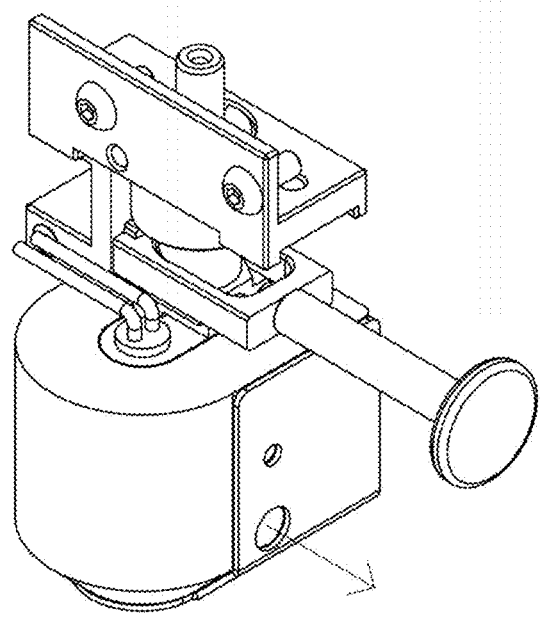
FIG. 8 is an isometric view illustrating an extruder with a system for fastening the nozzle in the extruder body that is of the fixed type.

In the fixed case (FIG. 8): the extruder is hyperstatically bound with mechanical components which do not allow for a fast replacement, in favor of greater robustness of the entire extruder-printing head apparatus.

In the case of a fast coupling/release (FIG. 9): the extruder is isostatically bound by manually or mechanically operated means, adapted to allow a fast replacement of the nozzle (5).

In the first embodiment described, the resistor (2) for heating the extruder body absorbs a power comprised between 100 W and 300 W and is powered with voltages comprised between 12V and 48V.

Figure 9:
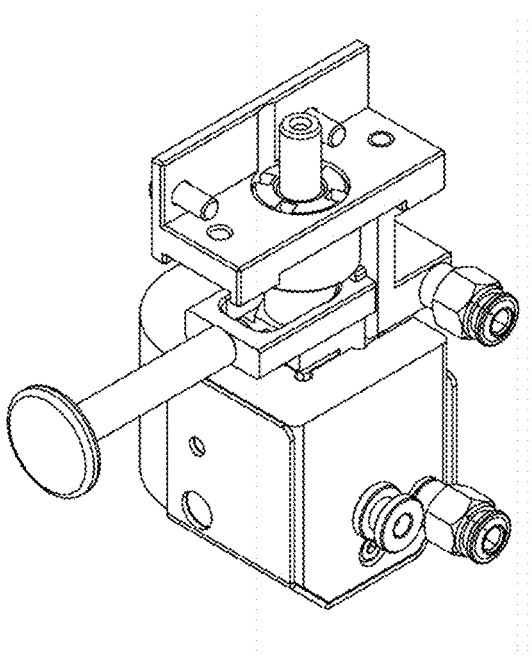
FIG. 9 is an isometric view illustrating an extruder with a system for fastening the nozzle in the extruder body that is of the fast coupling/release type.

The secondary cooling (10), which acts as a thermal break transversal to the nozzle (5), provides that the extruder body is made of steel by means of precision mechanical machining and has a geometry and cooling functions which are designed to obtain a determined temperature curve arranged along the length of the nozzle (FIG. 9).

Figure 10:
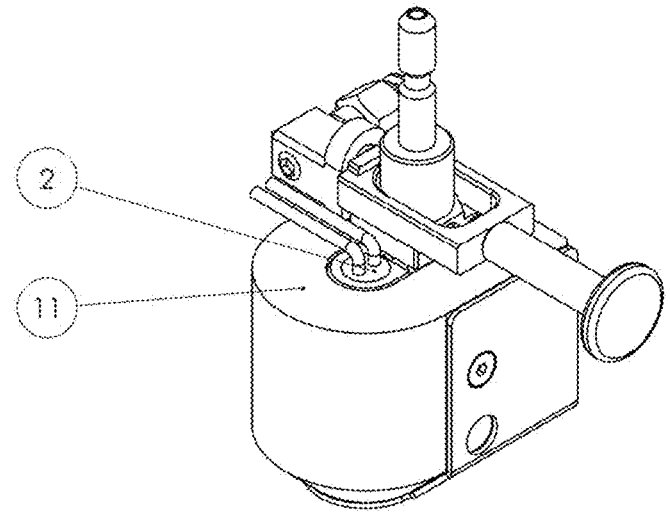
FIG. 10 is an isometric view illustrating an outer thermal insulation shell of an extruder.
Figure 11:
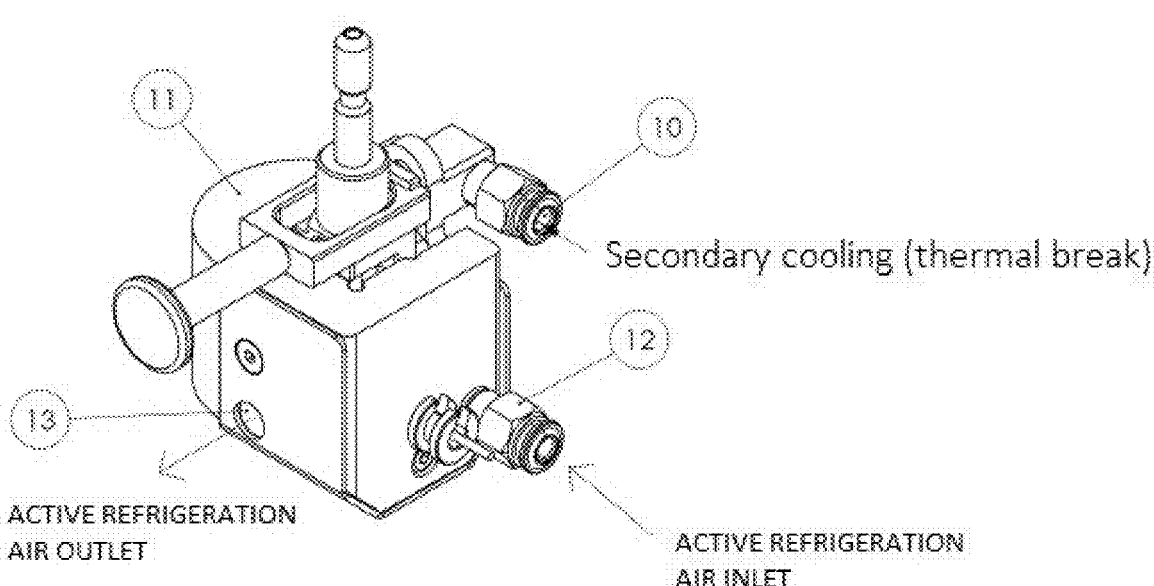
FIG. 11 illustrates an extruder with a shell designed to allow the inlet/outlet of the fluid for the active and controlled refrigeration of the extruder.
Figure 15:
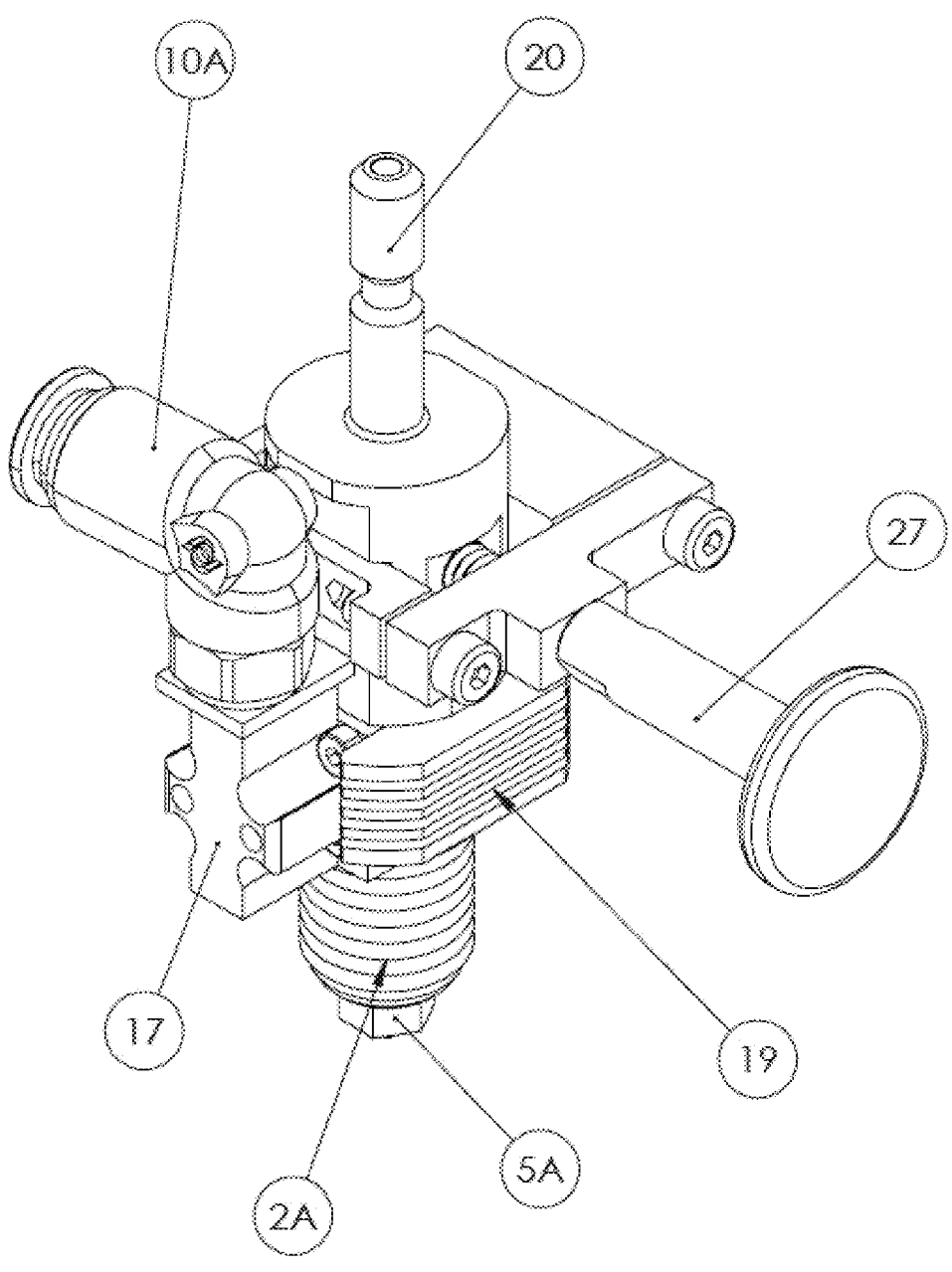
FIG. 15 is a first isometric view of a second embodiment of the extruder.
Figure 16:
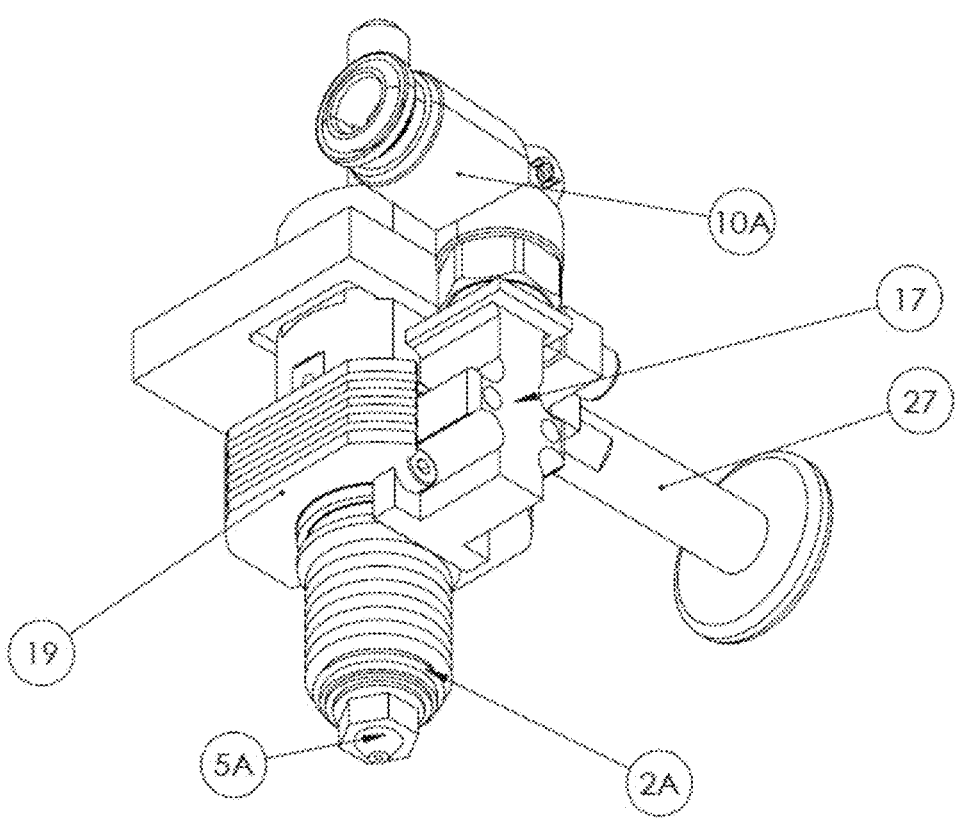
FIG. 16 is a second isometric view of a second embodiment of the extruder.
Figure 17:
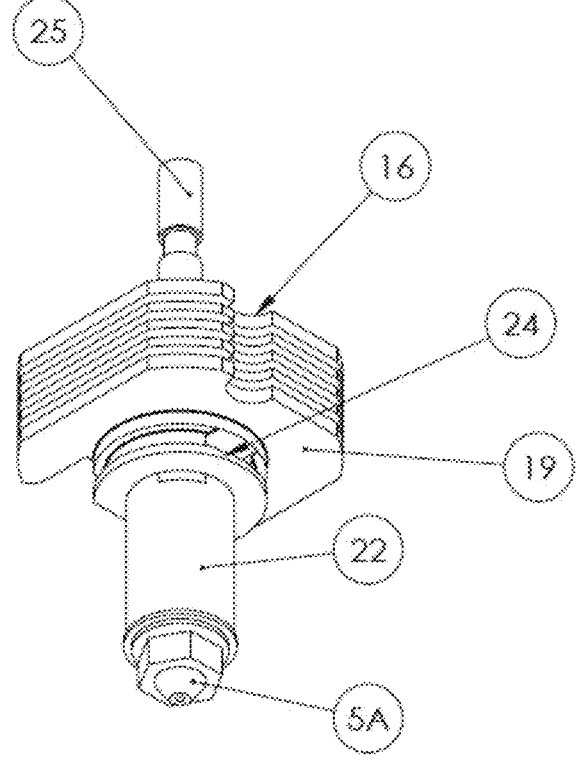
FIG. 17 is a detail of the extruder of FIGS. 15 and 16.
Figure 18:
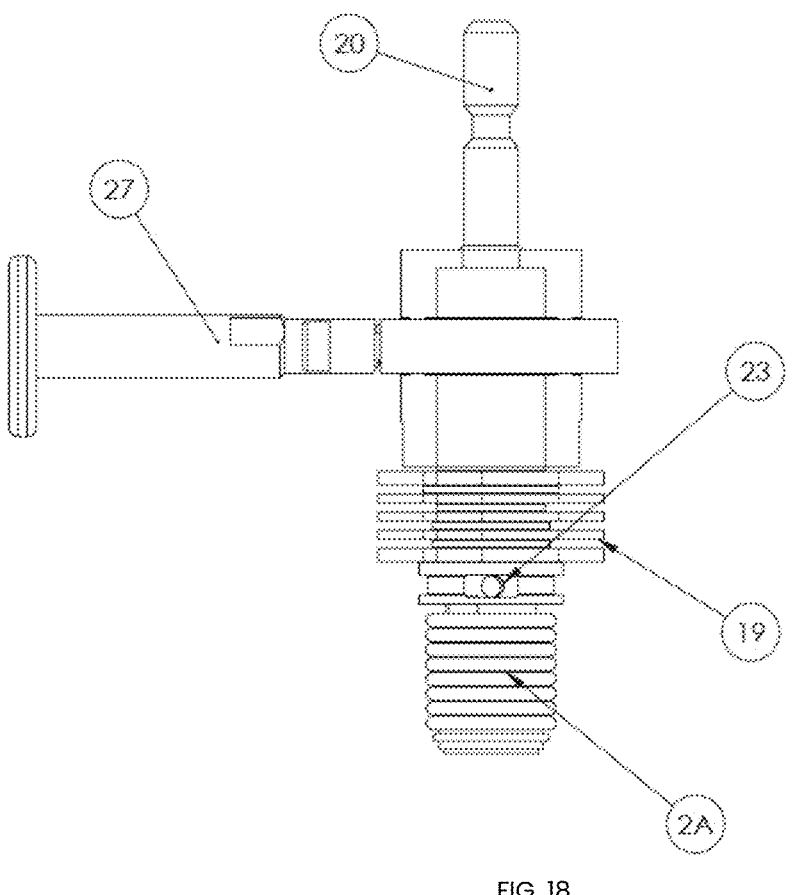
FIG. 18 is a further detail of the extruder of FIGS. 15 and 16.
Figure 19:
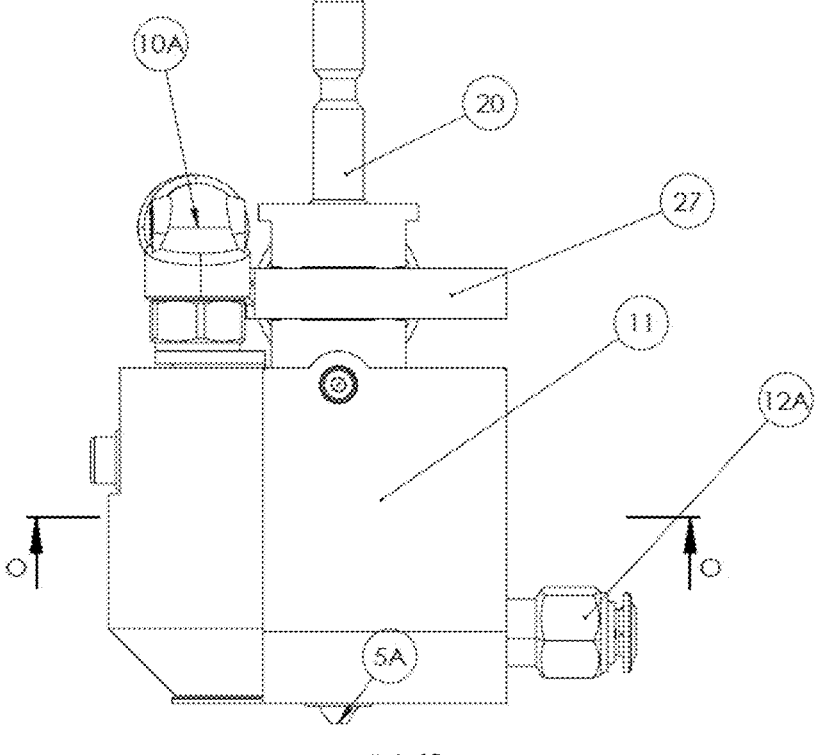
FIG. 19 is a side view of the extruder of FIGS. 15 and 16.
Figure 20:
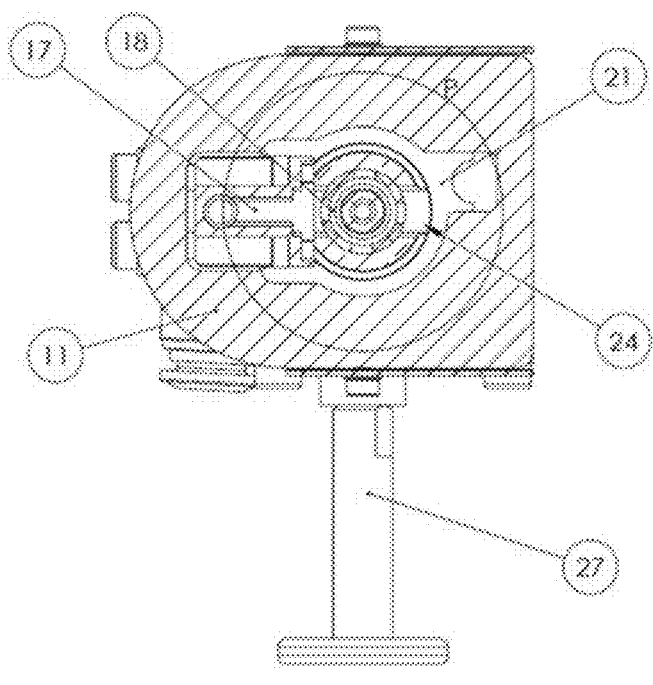
FIG. 20 is a top sectional view of the extruder of FIGS. 15 and 16.
Figure 21:
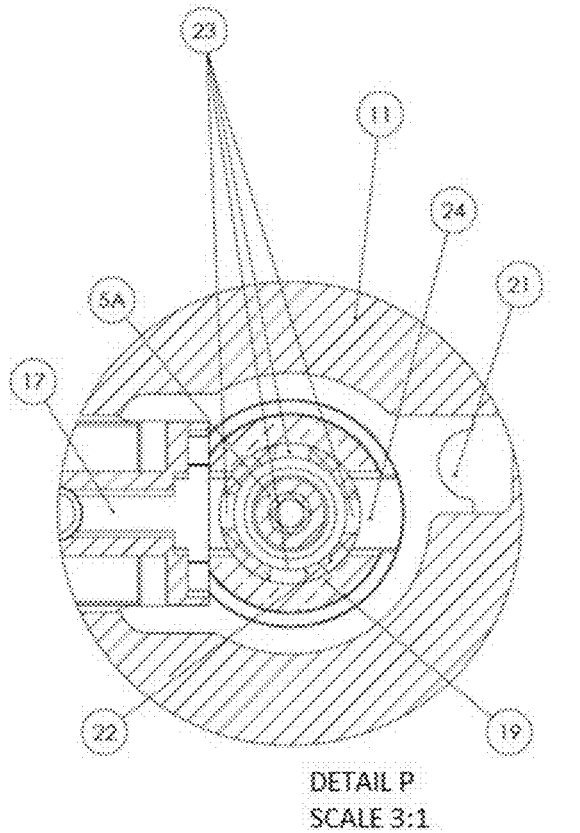
FIG. 21 is a detail view of FIG. 20.
Figure 22:
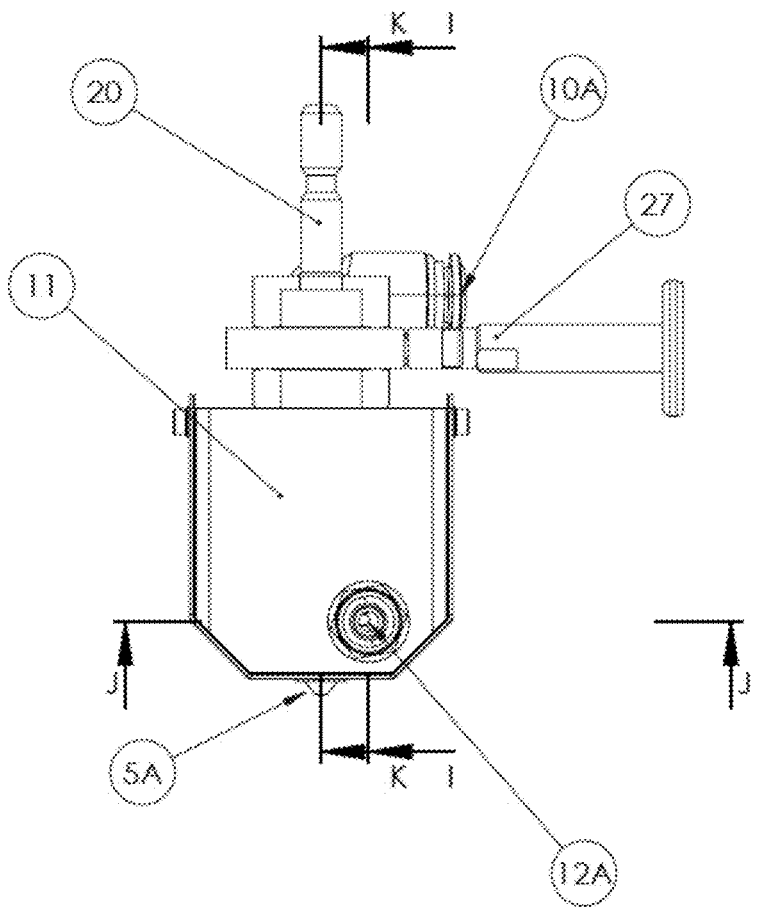
FIG. 22 a second side view of the extruder of FIGS. 15 and 16.
Figure 23:
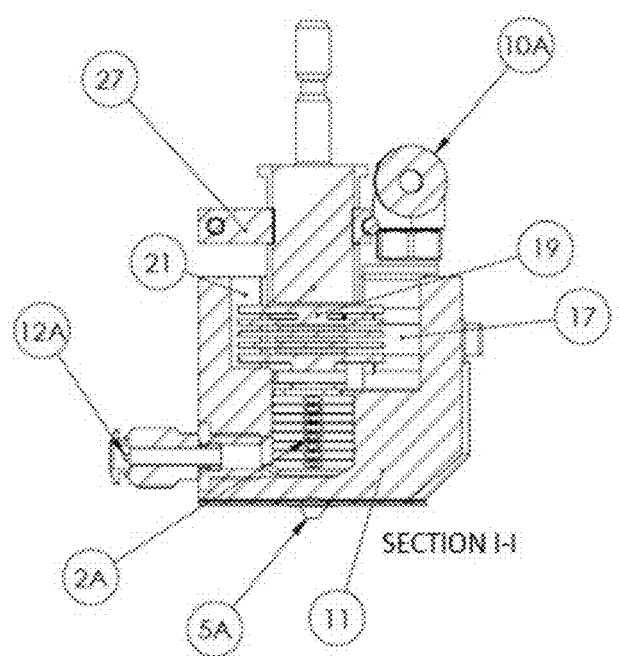
FIG. 23 is a first sectional view of FIG. 22.

An outer thermal insulation shell (11) is also provided (FIG. 10), which is made of materials having low heat exchange coefficients (ceramics, minerals or composite materials), and may also include possible external protections. Furthermore, said shell was designed to allow the inlet (12)/outlet (13) of the fluid for the active and controlled refrigeration of the extruder (FIG. 11)

According to the invention, said active refrigeration may be achieved by using compressed air or other fluids which are disposable in the environment or in a closed circuit. The compressed air may be directly or indirectly directed onto the nozzle (5) or other components of the extruder.

To this end, inside the body of the invention, channels or ducts are there, which direct the air flow or the cooling fluid flow to specific points, with a flow comprised between 20 L/min and 40 L/min. In the embodiment described (FIG. 6-7), the air inlet duct (12) ends up into a first chamber where the air is distributed on all the transverse refrigeration holes (6), which open into a second chamber to which the outlet duct (13) of the air itself is connected.

It is interesting to note that said refrigeration holes (6) are arranged between the nozzle (5) and the resistor (2), so that when the active refrigeration air passes therethrough, a sort of "cold wall" is created, parallel to the nozzle (5) to instantly stop the heat flow coming from the resistor (2) in the extruder body.

The temperature curve arranged along the length of the nozzle is shown in FIG. 12.

By means of Computational Fluid Dynamics analysis (CFD), the optimal geometry to achieve the desired object was selected.

To achieve this type of curve, the apparatus according to the invention may comprise further components, such as, for example, inserts made of different materials, designed to ensure specific temperature ranges in the different points of interest.

Furthermore, in the lower end part of the extruder body, surface coatings or inserts(9) may be found, adapted to favor the heat exchange towards the lower area of the extruder, where the tip of the nozzle (5) is placed.

In particular, materials with high heat exchange coefficients, such as copper or noble metals, may be used for such coatings or inserts (9).

These inserts (9), located in the lower part of the extruder, may also have a cylindrical or conical shape.

A second embodiment of the invention, shown in FIGS. 13 to 28, while implementing the same method for optimizing the multi-extruder deposition process in a 3D printer with two or more extruders previously described, relates to a different configuration of the extruder nozzle, the relative loading structure, the relative thermal break channels and the relative thermal insulation shell.

In this second embodiment, in fact, the extruder consists of a channel for transporting and melting the material, consisting of a loading channel (20), a nozzle (5A) and a support cannula (25) of the nozzle. In the embodiment described, a possible construction of the nozzle (5A) involves, as shown in FIG. 14, a straw (28) inserted into the support cannula (25). This straw (28), made of ceramic or polymeric material (Teflon), has the task of locally modifying the temperature distribution in the extrusion channel.

The nozzle (5A) and the relative support cannula (25) are inserted into the corresponding containment structure (22) of the nozzle, onto which a circular or spiral band heating resistor (2A) is keyed, in which a temperature probe is integrated. Furthermore, the cooling air does not pass along the transverse refrigeration holes as in the first embodiment, but it flows around the heating resistor essentially following a spiral path. Advantageously, according to the invention, this allows taking advantage of the best heat exchange coefficient determined by the swirling motion of the refrigeration fluid consisting of compressed air.

Also in this second embodiment of the invention, an outer thermal insulation shell (11) is provided, preferably made of ceramic material to insulate the extruder and to allow the cooling thereof by means of: a thermal break which separates the area for feeding/loading the material to be deposited from the melting area, as well as by means of an active cooling, both based on a compressed air flow. Said shell (11) may be made of a monolithic ceramic material, or of a multilayer material such as, for example, a ceramic material internally coated with an infrared reflective material, or of a non-ceramic material (a high-temperature polymeric material or metal), also internally coated with an infrared reflective material.

Figure 24:
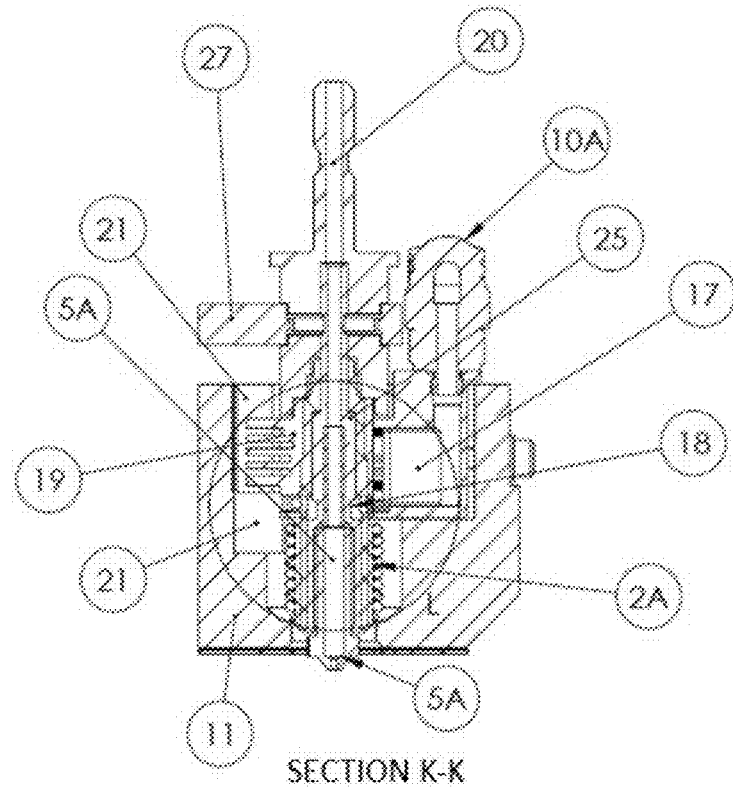
FIG. 24 is a second sectional view of FIG. 22.
Figure 25:
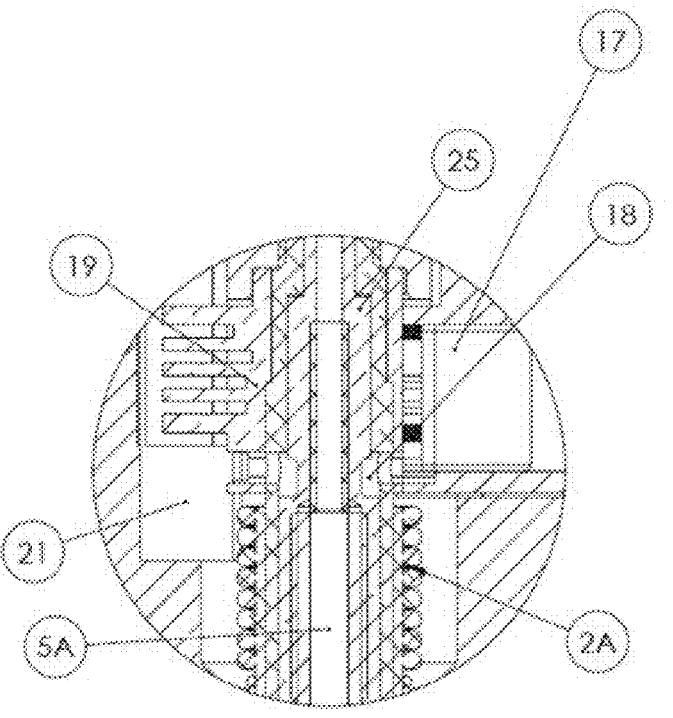
FIG. 25 is a detail of FIG. 24.
Figure 26:
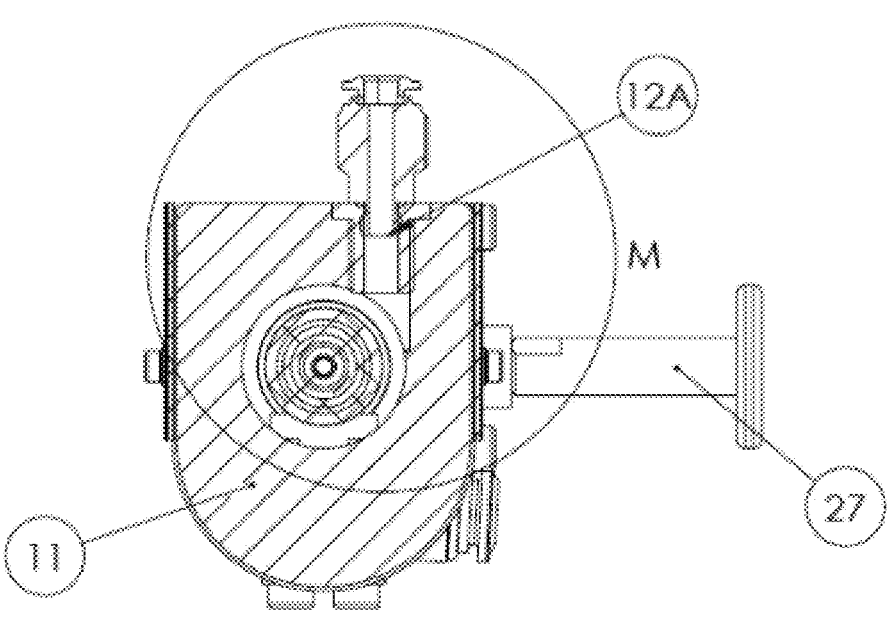
FIG. 26 is a third sectional view of FIG. 22.
Figure 27:
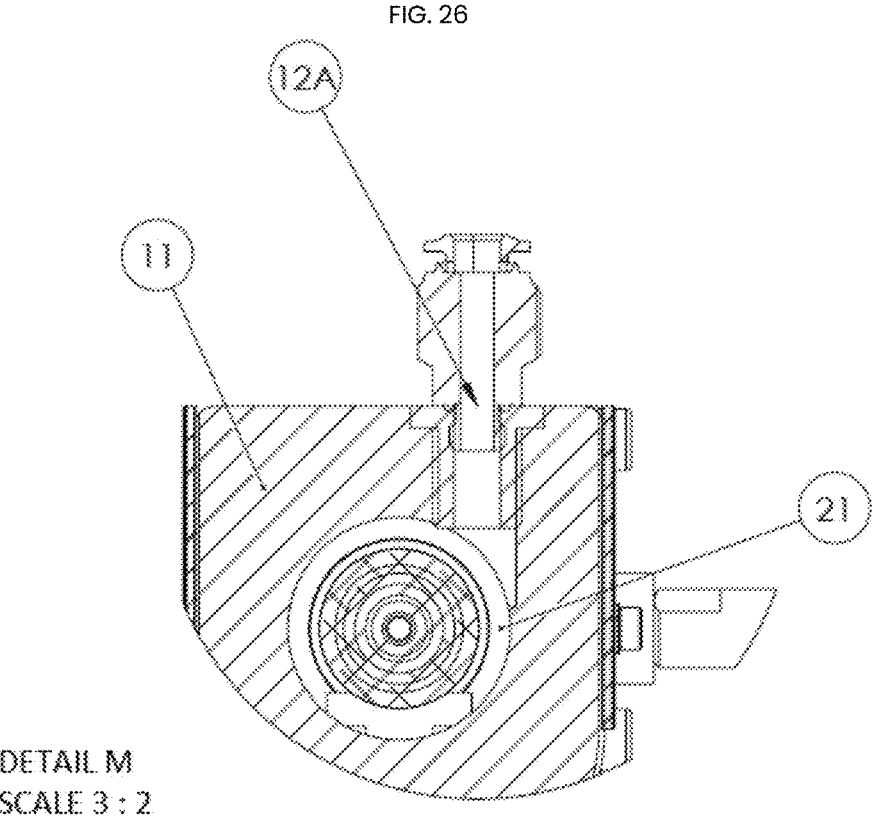
FIG. 27 is a detail of FIG. 26.
Figure 28:
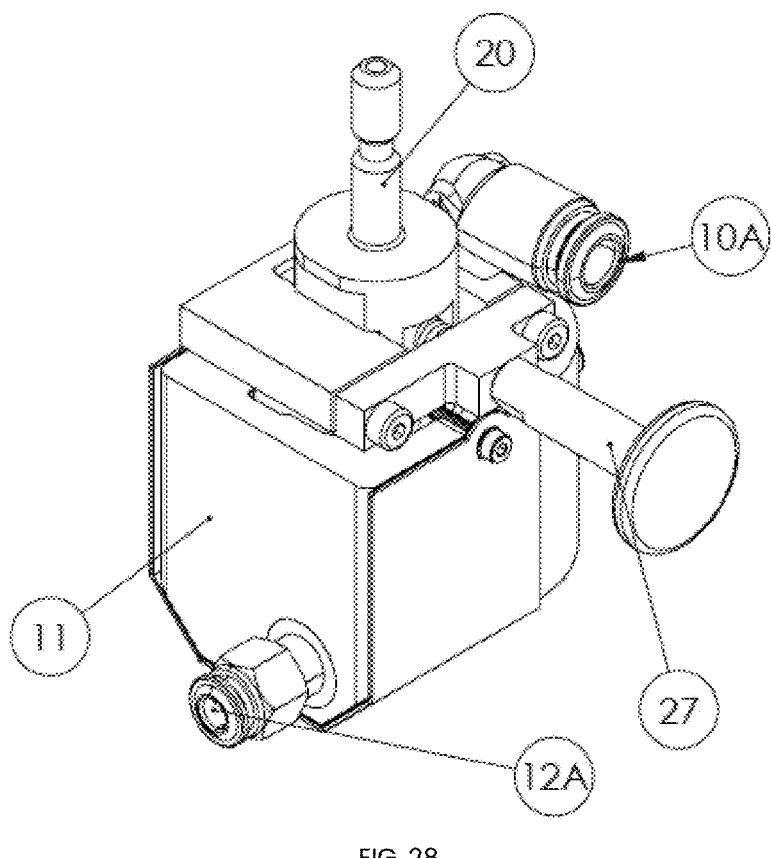
FIG. 28 is a sectional view of the extruder.

In this case, as shown in FIGS. 24 and 25, a continuous flow of compressed air is supplied to the extruder by means of the upper junction (10A), through the channel present in a special conveyor (17) which is configured to direct the compressed air both to the thermal break area (18) present on the support cannula (25) of the nozzle (5A), as well as to an air heat exchanger (19), which is not present in the first embodiment of the invention. The conveyor channel (17) is sized and shaped to provide an optimal distribution of the compressed air flow, adapted to have a clear thermal gradient in the extruder channel, between the melting area in the nozzle (5A) and the loading area (20) thereabove. The containment structure (22) of the nozzle (5A) does not have a binding which blocks the rotation thereof along the extrusion axis, therefore, during the assembly, it is not possible to predict the orientation of the cooling channels (23). In contrast, the conveyor (17) has a fixed orientation.

To allow the passage of air from the conveyor (17) to the thermal break area (18) present on the support cannula (25) of the nozzle (5A), in any configuration this is mounted, four ducts (23) are present on the nozzle containment structure (22), radially arranged at 90 degrees with respect to one another. The compressed air cools the thermal break area (18) present on the support cannula (25) of the nozzle (5A), entering from the four channels (23) and exiting from the channel (24), to then be evacuated from the channel (21).

The active cooling of the extruder, designed to allow a fast cooling of the extruder itself, is configured to direct the compressed air, entering through the lower junction (12A), into the cavity (21) which externally surrounds the heating resistor (2A). The conformation of the cavity (21) itself determines, in combination with the lower position of the inlet and the upper position of the outlet, as well as with the substantially circular conformation of the extruder, a spiral swirling flow which laps the outer surface of the extruder uniformly from bottom to top, thus allowing a fast and uniform cooling. The air is then evacuated from the channel (21).

Finally, it should also be noticed that in this second embodiment (shown in FIG. 13 onwards), the resistor (2) for heating the extruder body absorbs a power comprised between 60 W and 100 W, preferably comprised between 80 W and 100 W, and is powered with voltages comprised between 12V and 48V. This lower absorbed power, with respect to the first embodiment described herein, is obtained by virtue of the lower thermal capacity of the nozzle containment cylinder.

The invention claimed is:

1. A system for performing a multi-extruder deposition process in a 3D printer with two or more extruders, the system comprising:

a) an outer thermal insulation shell, which is made with one or more materials having low heat exchange coefficients; said shell being configured to allow the inlet/outlet of a fluid for the active and controlled refrigeration of the extruder;

b) at least one extruder;

wherein said extruder has a body comprising:

a polymer melting tank, an extruder nozzle, a temperature probe;

a first hole for housing a heating resistor of the polymer melting tank;

a second hole for housing the extruder nozzle;

one or more refrigeration holes for the melting tank;

a third hole for housing the temperature probe;

or said extruder has a body comprising:

a nozzle;

a containment structure for the nozzle in which the nozzle itself is inserted, a circular band heating resistor, in which a temperature probe is integrated, is keyed onto such containment structure;

a space about the heating resistor, in which the active and controlled refrigeration fluid flows about the heating resistor substantially following a spiral path starting from a lower inlet towards an outlet in an upper part, thus taking advantage of the best heat exchange coefficient determined by the swirling motion.

2. The system according to claim 1, wherein a lower end of the second hole for housing the nozzle has an edge with a geometry designed to favor the conduction of heat towards the area of contact with a lower tip of the nozzle itself.

3. The system according to claim 2, wherein said lower edge of the second hole for housing the nozzle is cylindrical or conical.

4. The system according to claim 1, wherein said first hole for housing the heating resistor is a through hole or a blind hole.

5. The system according to claim 1, further comprising means for fastening the nozzle onto the extruder body which are of the fixed type or with fast coupling/release.

6. The system according to claim 5, wherein, in the event of a fixed fastening, the extruder is hyperstatically bound with mechanical components which do not allow for a fast replacement of the nozzle.

7. The system according to claim 5, wherein, in the event of a fastening with fast coupling/release, the extruder is isostatically bound by manually or mechanically operated means, adapted to allow a fast replacement of the nozzle.

8. The system according to claim 1, wherein the resistor which heats the polymeric material in the melting tank absorbs a power comprised between 60 W and 300 W and is powered with voltages comprised between 12 V and 48 V.

9. The system according to claim 1, further comprising secondary cooling means, configured to act as a thermal break transversal to the nozzle, suitably arranged in the extruder body.

10. The system according to claim 1, wherein said active refrigeration is obtained by means of compressed air or other fluids to be lost in the environment or in a closed circuit; wherein the compressed air is directly or indirectly directed onto the nozzle or other components of the extruder.

11. The system according to claim 10, wherein inside the extruder body there are channels or ducts configured to direct the flow of air or of the cooling fluid to specific points, with a flow comprised between 20 L/min and 40 L/min.

12. The system according to claim 11, wherein the lower inlet opens into a first chamber where the fluid is distributed on transverse refrigeration holes, which open into a second chamber to which the outlet of the fluid itself is connected.

13. The system according to claim 12, wherein said refrigeration holes are arranged between the nozzle and the resistor, so that when the active refrigeration fluid passes therethrough, a relatively cooler barrier is created, parallel to the nozzle which applies a break to stop the heat flow coming from the resistor in the extruder body.

14. The system according to claim 1, further comprising inserts made of different materials, configured to ensure specific temperature ranges in different points of interest.

15. The system according to claim 14, wherein in the lower end part of the extruder body there are surface coatings or inserts, adapted to favor the heat exchange towards the lower area of the extruder, where the tip of the nozzle is placed.

16. The system according to claim 15, wherein such coatings or inserts are made of materials with predetermined heat exchange coefficients.

17. The system according to claim 1, wherein the body of said nozzle consists of a loading channel, a nozzle and a support cannula of the nozzle itself.

18. The system according to claim 17, wherein said nozzle and said support cannula are inserted into a corresponding containment structure of the nozzle itself, onto which said circular band heating resistor is keyed.

19. The system according to claim 1, wherein said outer shell is made of a monolithic ceramic material, or of a multilayer material, or of a non-ceramic material.

20. The system according to claim 17, wherein a continuous flow of compressed air is fed to the extruder by means of an upper junction, through a channel present in a special conveyor which is configured to direct the compressed air both to a thermal break area present on the support cannula of the nozzle, and to an air heat exchanger.

21. The system according to claim 20, wherein said conveyor channel is sized and shaped to provide an optimal distribution of the compressed air flow, adapted to have a clear thermal gradient in the extruder channel, between a melting area in the nozzle and a loading area thereabove.

22. The system according to claim 20, wherein, to allow the passage of air from the conveyor to the thermal break area present on the support cannula of the nozzle, in any configuration it is assembled, four ducts are present on the nozzle containment structure, radially arranged at 90 degrees with respect to one another; thus obtaining that the compressed air cools the thermal break area present on the support cannula of the nozzle, by entering from the four channels and exiting from the channel, to then be evacuated from the channel.

23. A method for performing a multi-extruder deposition process in a 3D printer with two or more extruders, utilizing a system according to claim 1, wherein the method involves managing the temperature of each extruder by means of active refrigeration means sized so as to have a sudden control of the cooling ramp and to manage the viscosity of the material in the event of extruder change; wherein, for the entire duration of the printing with another extruder, the extruder nozzle not used remains in a limited range around the extrusion temperature, thus eliminating downtime, while the solidified filament from the sudden forced cooling is pulled back into a low temperature nozzle area where it does not degrade during the period of non-use.

24. The method according to claim 23, wherein the cooling step is managed by a dedicated control system, forcing an air flow between 10 L/min and 100 L/min through the extruder body; wherein the active control of the cooling step, and therefore of the viscosity of the polymer, involves eliminating the contamination of the printed part due to losses of material and ensuring an effective cleaning of a melting tank during the retraction of the filament and the regeneration of the tank itself.

25. The method according to claim 23, wherein the method involves virtually dividing the nozzle into two different regions:

a region called pre-chamber, defined by "wire tear distance"

and a region called chamber, defined by "unload distance", which is the portion of the inner volume of the nozzle corresponding to the melting tank, in which the material is in the molten state when the nozzle is in use; wherein the volume of the individual regions is optimized for each filament, modifying the length of such regions, and wherein the two regions are managed in different steps in the extruder change: during the extruder change procedure, the filament is retracted in two different positions corresponding to the maximum heights of the two regions.

26. The method according to claim 25, wherein said filament retraction positions are established directly the printer following the next four steps:

Part Removal: moving the printing head of the 3D printer from the 3D printing object to a cleaning tray Purge ExA: passivation of the active extruder and extruder switch Purge EXI: regenerating the melting tank of the new activated extruder Part Approaching: retrieval of the printing coordinate by the printing head, referring to the extruder just activated;

wherein all the movements of the printing head of the 3D printer, performed by the printing plane towards the cleaning tray, start after having carried out a sudden reduction of the polymer temperature by means of the active refrigeration means and then a retraction of the active extruder filament equal to the length of the pre-chamber (wire tear distance).

27. The method according to claim 25, wherein, for all the extruders which pass and/or remain in a state of non-activity, the filament is retracted up to the deactivation position equal to the chamber (wire unload distance).

28. The method according to claim 23, wherein each time an extruder passes from the inactive state to the active state, the regeneration of the melting tank is provided by carrying out an extrusion whose function is to eliminate the part of filament inside the nozzle which is exposed to temperatures close to the melting point and to clean the inner walls of the nozzle, so as to always ensure the same quality of the extruded polymer.

29. The method according to claim 23, wherein, in the event of a printing head provided with at least two extruders T0 and T1, during an extruder change sequence, passing from extruder T0 to extruder T1, the following steps are provided:

Start of Sequence

T0 ACTIVE

"PART REMOVAL":

a) Activating active refrigeration (T =Printing temperature-delta temperature)

b) Storing printing coordinate c) Retracting filament to an extent equal to the length of the pre-chamber d) Lowering printing plane e) Moving printing head into park position at cleaning tray

"PURGE EXA":

f) Checking temperature (T=Printing temperature-delta temperature)

g) Retracting filament to an extent equal to the length of the entire chamber h) Performing a cleaning sequence of the tip of the extruder nozzle TO onto a brush and onto a spatula in the cleaning tray

"ACTIVATION OF PASSIVATED EXTRUDER":

the activation/passivation occurs by means of a pneumatic piston managed by a PLC-controlled solenoid valve which moves the selected extruder transversely with respect to the printing plate so as to alternately lower or raise the extruders according to the selected one;

extruders T0 and T1 being integral with the printing head, the transverse movement is superimposed to a translational movement in the plane XY of the head so as to position the newly selected extruder in the same coordinate as the passivated one;

T1 ACTIVE

"PURGE EXI":

i) Activating extruder heating T1 (T=printing T)

j) Extruding an amount of filament equal to the length of the chamber plus an additional amount to regenerate the chamber k) Retracting an amount equal to the length of the pre-chamber

"PART APPROACHING":

l) Checking the extruder temperature T1 (T=printing T)

m) Performing the cleaning sequence of the tip of the extruder nozzle T1 onto the brush and onto the spatula in the cleaning tray n) Restoring the position (X, Y) of the 3D printer printing head on the printing plane o) Raising the printing plane to restore the position Z thereof p) Performing an extrusion of the filament equal to the volume of the pre-chamber Sequence ended.

* * * * *